United States Patent [19]
Vetter

[11] Patent Number: 4,991,955
[45] Date of Patent: Feb. 12, 1991

[54] CIRCULAR PROJECTION AND DISPLAY SYSTEM USING SEGMENTED TRAPEZOIDAL SCREENS

[75] Inventor: Richard Vetter, Pacific Palisades, Calif.

[73] Assignee: Todd-AO Corporation, Los Angeles, Calif.

[21] Appl. No.: 506,289

[22] Filed: Apr. 6, 1990

[51] Int. Cl.$^5$ .............................................. G03B 37/00
[52] U.S. Cl. ...................................... 352/69; 352/70; 350/125; 353/48
[58] Field of Search ..................... 352/69, 70; 353/48; 350/125

[56] References Cited

U.S. PATENT DOCUMENTS

| | | |
|---|---|---|
| 1,199,460 | 9/1916 | Featherstone . |
| 1,272,623 | 6/1918 | Comstock . |
| 2,795,996 | 6/1957 | Sauer . |
| 2,942,516 | 6/1960 | Disney et al. ......................... 352/70 |
| 3,107,577 | 10/1963 | Adams ................................. 352/70 |
| 3,118,340 | 1/1964 | Iwerks . |
| 3,313,068 | 4/1967 | Pinto .................................... 352/69 |
| 3,785,715 | 1/1974 | Mecklenborg . |
| 4,473,355 | 9/1984 | Pongratz . |
| 4,641,918 | 2/1987 | Moffatt et al. ........................ 352/69 |

FOREIGN PATENT DOCUMENTS 506234 9/1930 Fed. Rep. of Germany ........ 352/69

Primary Examiner—Monroe H. Hayes
Attorney, Agent, or Firm—Poms, Smith, Lande & Rose

[57] ABSTRACT

A circular projection system using segmented trapezoidal screens arranged in a continuous arcuate array about a central vertical axis. The top of each screen is tilted downward. Each screen is illuminated by a projector which is mounted above and behind the screen which opposes it. The image from each projector is also angled downward.

For an eight-screen system, each screen is tilted by approximately 8°. For a nine-screen system, each is tilted by approximately 7°. For maximum linearity, the ratio of the distance between the projector lens and the top of the screen on which it projects to the width of the top of said screen is substantially equal to the ratio of the distance between the projector lens and the bottom of said screen to the width of the bottom of said screen.

22 Claims, 3 Drawing Sheets

CIRCULAR PROJECTION AND DISPLAY SYSTEM USING SEGMENTED TRAPEZOIDAL SCREENS

BACKGROUND OF THE INVENTION

1. Field of the Invention

This invention generally relates to picture projection and display systems and, more specifically, to motion picture film displays and apparatuses which provide a continuous picture on a substantially circular screen.

2. Description of the Related Art

Motion picture systems which display the picture on a 360° cylindrical screen are becoming increasingly popular in theme parks, amusement centers and local and international exhibits. The illusion of being completely surrounded by the film environment is visually overwhelming and psychologically satisfying.

A typical panaramic motion picture presentation arrangement is shown in U.S. Pat. No. 2,942,516, issued to Disney et al. It includes a plurality of conventional rectangular screens oriented in a large circle. Each screen is separated from its neighbor by a vertical strip of non-reflecting material. A small projection port is provided at the approximate center of each of the separating strips, behind which lies a projector. Persons viewing the picture stand beneath this circular viewing screen arrangement.

One serious problem with this type of system is degradation in picture contrast and color saturation caused by projected light being reflected off of one screen and onto the screen opposite it. This is known as "crosstalk" or "re-illumination."

Another problem with systems of this type is that the perceived brightness of each picture is lessened because the reflected light off of each screen is not principally focused toward where the majority of viewers is present, i.e., the center of the system. Picture linearity is also poor since rectilinear film images are projected onto surfaces which, from the projector's perspective, appear to be curved. This results in what is commonly referred to as "horizontal sag" below the center of each screen and "scalloping" above the center. Vertical images, such as buildings, also tend to converge upward creating the illusion of "falling away" from the viewer.

Systems of this type are also restricted to an odd number of screens because of the need to project from the approximate center point of the opposing intersection of two screens. This is not always desirable. For example, a taller picture can be obtained without changing the aspect ratio by switching from a nine-to an eight-screen system without significantly sacrificing the circular picture effect. This obviously cannot be done in systems of the type shown in the Disney U.S. Pat No. 2,942,516, which are limited to an odd number of screens.

SUMMARY OF THE INVENTION

One object of this invention is to obviate these and other problems in the prior art.

Another object of the invention is to provide a circular projection system in which cross-reflections are minimized.

A still further object of the invention is to provide a circular projection system in which visual linearity is virtually distortion-free.

A still further object of the invention is to provide a circular projection system which presents a brighter screen image to much of the audience.

A still further object of the invention is to provide a circular projection and display system which allows the use of an even number of screens, thereby allowing for the projection of a taller picture without altering the aspect ratio.

These as well as still further objects and benefits of the invention are realized by arranging a plurality of flat trapezoidal screens in a continuous arcuate array positioned about a central vertical axis. Each of the trapezoidal screens is tilted downward toward the viewers, and each trapezoidal screen is illuminated by a projector positioned above the opposing trapezoidal screen. The picture image from each projector is also tilted downward.

In the preferred embodiment, the ratio between the distance from the projector lens to the top of the screen onto which it projects and the top width of said screen is substantially equal to the ratio between the distance from the projector lens to the bottom of said screen and the bottom width of said screen. For a system with nine trapezoidal screens, each trapezoidal screen is preferably angled downward approximately 7°. For a system with eight trapezoidal screens, the angle of downward tilt is preferably approximately 8°. Other measurements of the system are also selected in accordance with preferred formulae.

These as well as other objects, features and advantages of the invention will now be explained with reference to the following drawings and specification.

DESCRIPTION OF THE PREFERRED EMBODIMENTS

Figure 1:
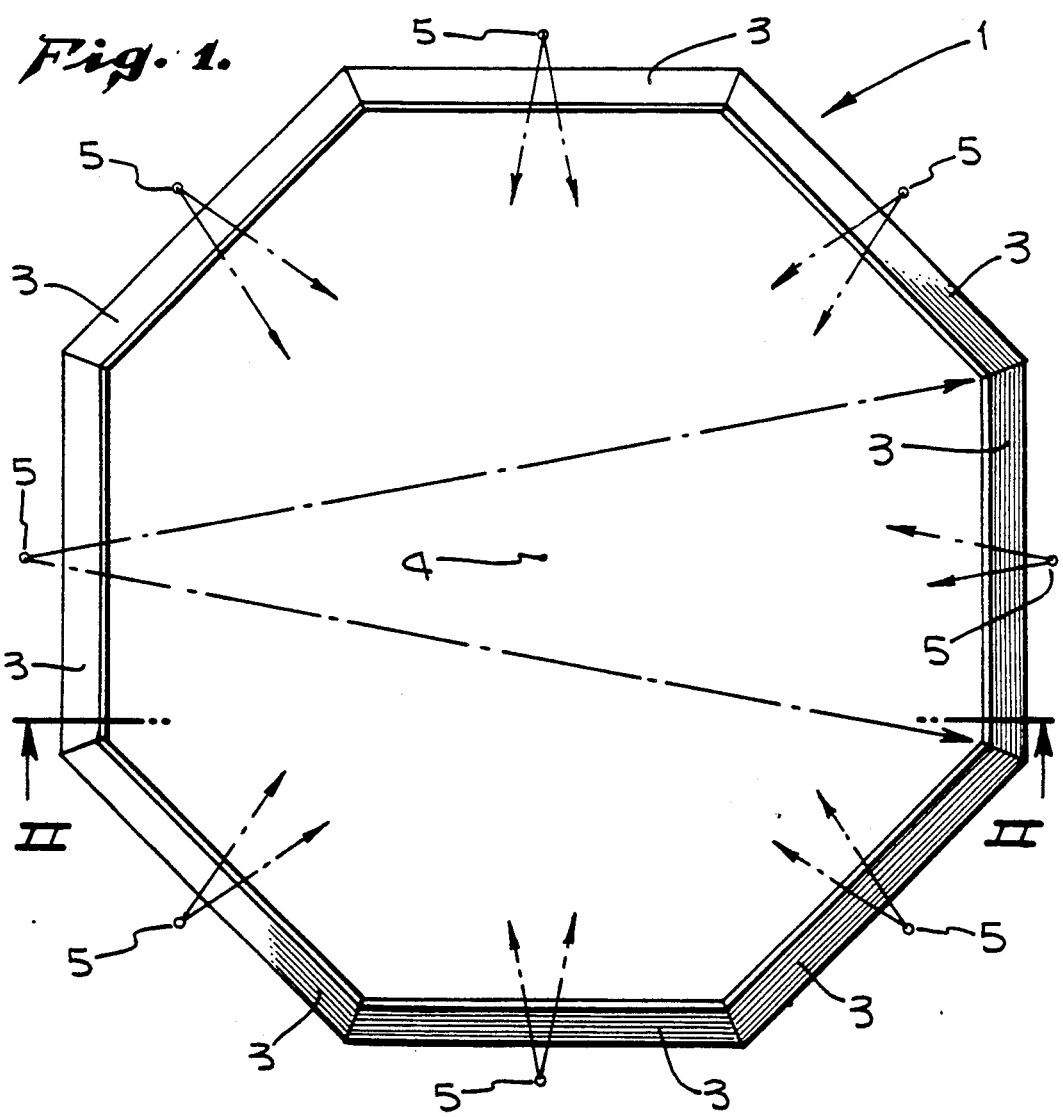
FIG. 1 is a top view of the screens and projectors used in a circular projection and display system made in accordance with one embodiment of the invention.
Figure 2:
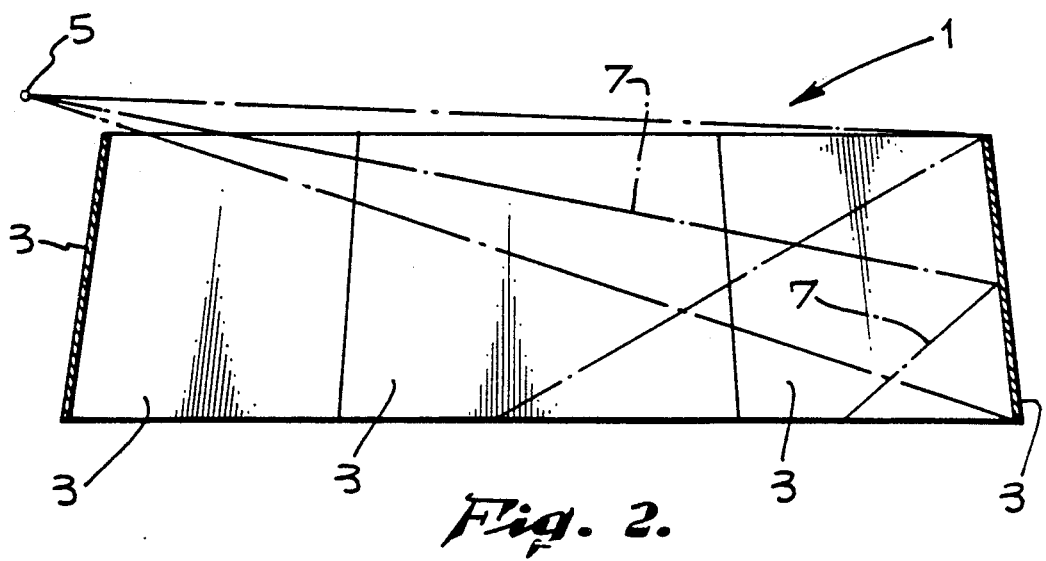
FIG. 2 is a cross-sectional side view of the screens and of one projector, taken along the line II—II in FIG. 1.

FIG. 1 is a top view of the screens and projectors used in one circular projection system made in accordance with the invention. FIG. 2 is a side view of FIG. 1 taken along the line II—II.

As shown in FIGS. 1 and 2, a circular projection and display system 1 includes a plurality of flat trapezoidal reflecting screens 3 arranged in a continuous arcuate array positioned about a central vertical axis 4. As can best be seen in FIG. 2, the top portion of each screen is tilted inward, so that each screen is tilted to face slightly downward.

The circular projection and display system 1 also includes a plurality of projectors 5. Each projector is mounted above and behind each screen 3 and is oriented such that its lens 6 provides a projected image which is angled downward toward the respective, opposing screen.

As is best seen in FIG. 2, there is a doubled tilting arrangement: both the projectors and the screens are tilted downward. This results in the principle image 7 being directed to approximately the center of the projection system 1, i.e., the location of most of the viewing audience. This results in maximum viewing brightness and minimum cross-reflections.

No screen 3 is perpendicular to the image projected from its respective projector 5; nevertheless, the trapezoidal shape of each screen 3 reduces horizontal "sagging" and "scalloping" and vertical "falling away." The screens 3 and projectors 5 are angled such that, from the perspective of most of the viewing audience, the surface of each screen 3 appears to be a rectangle, the image from the projectors 5 substantially covering without overlap the surface of each screen 3.

Figure 3:
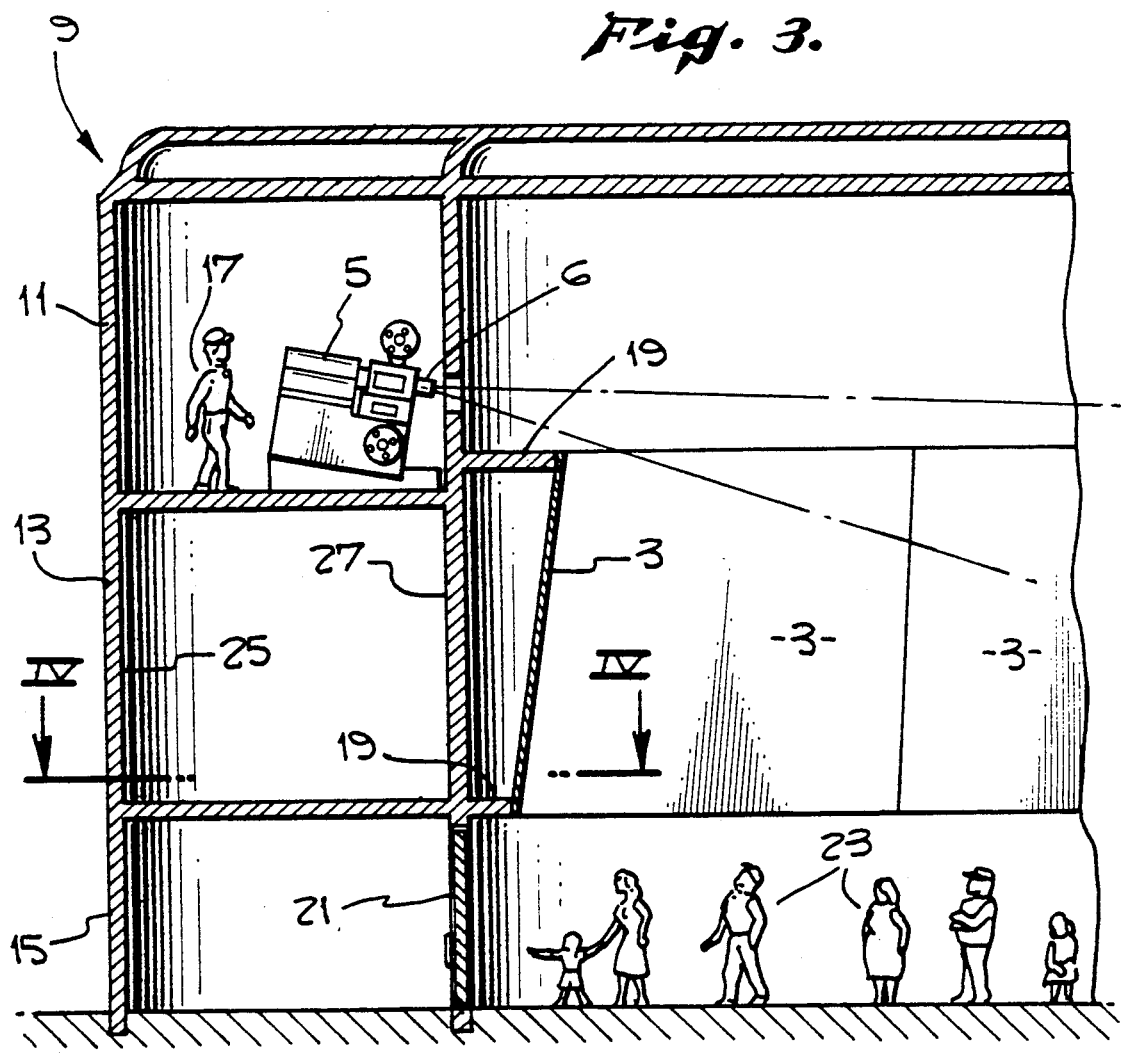
FIG. 3 is a pictorial side view of the support structure for the screens and projectors shown in FIG. 1.
Figure 4:
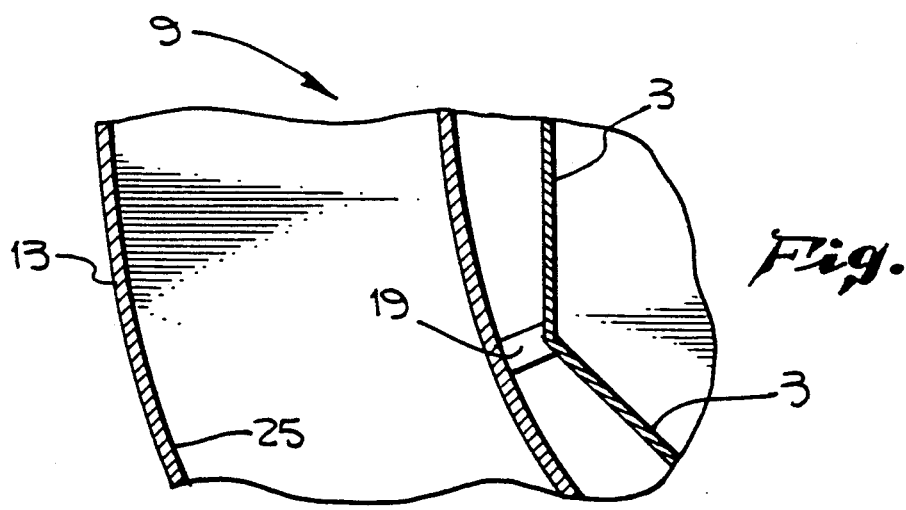
FIG. 4 is a cross-sectional bottom view of FIG. 3 taken along the line IV—IV.

FIG. 3 illustrates one embodiment of a supporting structure 9 which can advantageously be used to house the projection system shown in FIG. 1. FIG. 1 is a sectional view of FIG. 3 taken along the line IV—IV in FIG. 3.

As shown in FIG. 3, the supporting structure 9 includes an upper level 11, a middle level 13, and a lower level 15.

The upper level 11 is generally used to house the projectors 5 and one or more projectionists 17. The middle level 13 contains structural supports 19 which support each screen 3 at the appropriate position and angle. The lower level 15 provides an entranceway 21 through which viewers 23 can enter the theater and gaze upward at the screens 3. Vertical walls 25 and 27 separate and support each of the levels 11, 13 and 15.

Figure 5A:
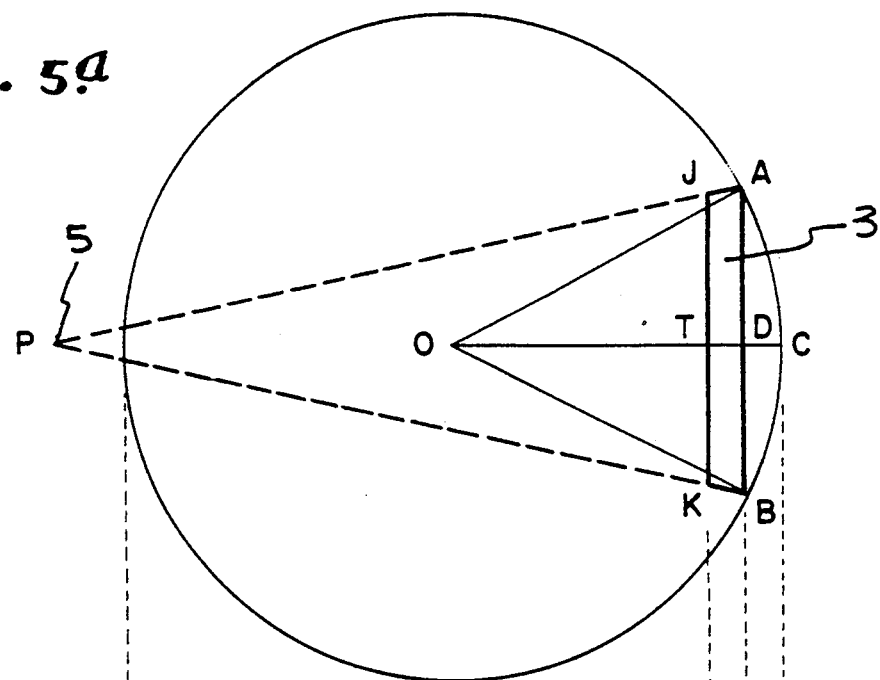
FIGS. 5(a) and 5(b) are geometric representations illustrating a top and a side view, respectively, of one of the screens and projectors shown in FIG. 1. These figures illustrate the geometry of a system with an arbitrary number of screens and show the location of many of the measurements which are selected in accordance with preferred formulae.
Figure 5B:
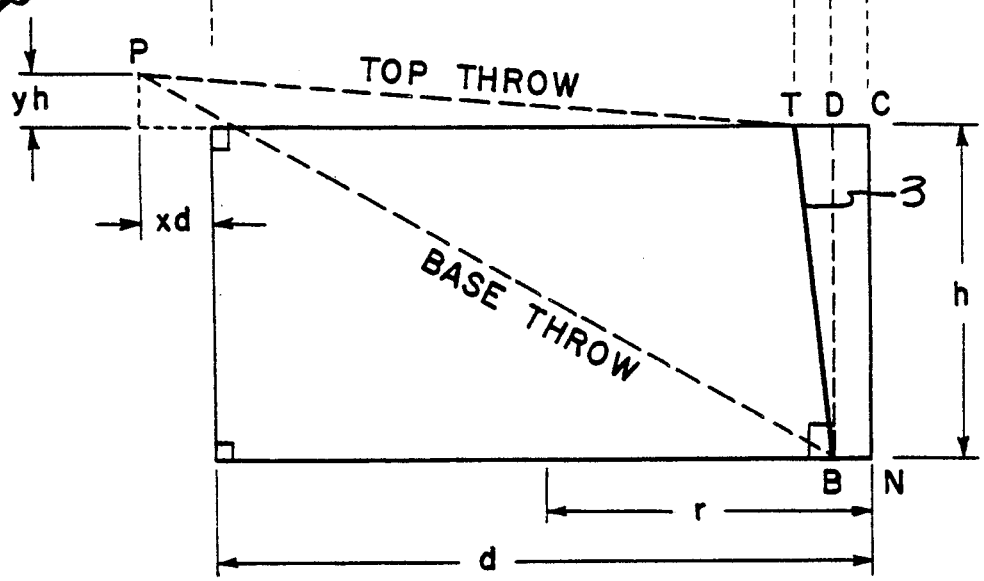
Figure 5C:
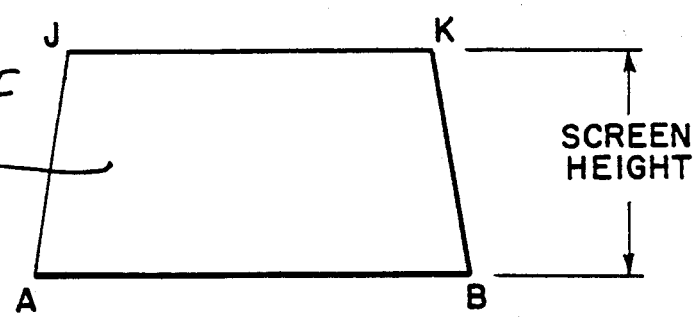
FIG. 5(c) illustrates the geometry of one of the screens made in accordance with the invention.

FIGS. 5(a) and 5(b) are geometric representations of a top and side view of one of the projectors 5 and its opposing screen 3. FIG. 5(c) is a geometric representation of one of the trapezoidal screens 3. The geometry of the projection and display system according to the invention will now be described with reference to FIGS. 5(a), 5(b) and 5(c). In referring to these figures, square brackets [] are used to indicate the length of the line segment whose endpoints are given within the brackets; for example, [AB] indicates the length of line segment AB. One projection screen is shown and is represented by the trapezoid ABJK, where AB is the base edge of the screen and JK is the top edge. The following abbreviations are used, and the following relationships hold:

1. n: number of screens;
2. r: radius of the circle in which the polygon formed by the bases of the screens is inscribed, r=[OC] where O is the center of the circular screen arrangement;
3. d: diameter of the circle; d=2* r;
4. t: tilt angle of each screen (angle of DBT);
5. a: half angle of screen chord (angle of AOD); a=180/n
6. P: a point representing the projector 5;
7. BSW: base screen width=[AB]; BSW=2*r*SIN (a)
8. BCD: base chord depth=[CD]; BCD=r*(1−COS (a))
9. CSB: center to screen base=[OD]; CSB=4*COS (a)
10. HSC: height of screen cylinder=[BD].

In deriving the expression for HSC, it is important to note that the typical aspect ratio of the screens used in the art is 4:3; that is, measured from the center of the auditorium, the vertical angle of projected image is three-fourths the horizontal angle of the projected image. As one example, with nine screens each screen will be 360/9=40° wide and 30° high, as seen by a spectator in the center of the auditorium. One result of this is that the fewer the screens used, e.g., 8, 7 or 6, the higher each screen may be in a room of a given size. The flexibility provided by the invention facilitates reductions in the number of screens since the principles of the invention are equally applicable to projection systems with odd and even numbers of screens. The invention is not limited to a 4:3 aspect ratio. If a different aspect ratio is used, the factor ¾ in the following expression for HSC should be changed to reflect the actual ratio.

$$HSC = 2 * r * COS(a) * TAN((\tfrac{3}{4}) * (360/n)/2)$$
$$= 2 * r * COS(a) * TAN(135/n)$$

11. STD: screen tilt depth=[DT]; STD=HSC * TAN(t)
12. SHT: screen height=[BT]; SHT=HSC/COS(t)
13. TSW: top screen width=[JK]; TSW=2 * (4−BCD−STD) * TAN(a)
14. NPX: radial distance of projection lens nodal point behind screen cylinder;
15. NPY: height of projection lens nodal point above screen cylinder base; NPY=(1+y) * HSC, where y is a predetermined vertical offset factor;
16. TPT: top projection throw=[PT]; TPT=SQRT(((1+x)*d−STD−BCD)$^2$+(y*HSC)$^2$);
17. BPT: base projection throw=[PB]; BPT=SQRT((1+x)*d−BCD)$^2$ +((1+y)*HSC)$^2$);
18. CST: center to screen top=[OT]; CST=r−BCD −STD;
19. FIW: film image width (normally a known standard);
20. f: focal length of projection lens; f=(TPT/TSW)*FIW Because image width is a linear function of distance from the point of projection, the following expression also applies:

$$\frac{\text{top projection throw } (TPT)}{\text{top screen width } (TSW)} = \frac{\text{base projection throw } (BPT)}{\text{base screen width } (BSW)}$$

The geometry of prototypes of a nine-screen and of an eight-screen projection system is set forth in the following Table 1. These prototypes are given as examples only. The tilt angles shown were found to be optimal by experimentation. In actual implementations, diameters and projector offsets will be determined based on the available space and the desired size of the theater. The invention does not require any particular dimensions or offsets, although the choices made for these dimensions will, of course, require recalculation of the remaining quantities to maintain the above-mentioned geometrical relationships.

In Table 1, the first column gives the abbreviation of the quantity in question; the second column, where applicable, gives the quantity in terms of the geometric relationships illustrated in FIG. 5; the third column sets forth the measurements for a nine-screen system; and the fourth column sets forth the measurements for an eight-screen system. Except as otherwise indicated, linear values are given in feet and angles are given in degrees. Most linear values on the order of feet are rounded to two decimal places for clarity; this degree of precision is satisfactory for most practical applications. For the sake of clarify, some quantities are expressed in terms of others.

TABLE 1

| Quantity | FIG. 5 equiv. | 9-screen syst. | 8-screen syst. |
|---|---|---|---|
| n | | 9 | 8 |
| r | [OC] | 23.00 | 32.00 |
| d | | 46.00 | 64.00 |
| t | angle of DBT | 7.022 | 8.002 |
| a | angle of AOD | 20.0 | 22.5 |
| BSW | [AB] | 15.73 | 24.49 |
| BCD | [CD] | 1.39 | 2.44 |
| CSB | [OD] | 21.61 | 29.56 |
| HSC | [BD] | 11.58 | 17.94 |
| STD | [DT] | 1.43 | 2.52 |
| SHT | [BT] | 11.67 | 18.11 |
| TSW | [JK] | 14.69 | 22.40 |
| NPX | x*d | 0.016*d | 0.016*d |
| NPY | (1+y)*HSC | 1.078*HSC | 1.115*HSC |
| TPT | [PT] | 43.93 | 60.10 |
| BPT | [PB] | 47.04 | 65.71 |
| CST | [OT] | 20.19 | 27.04 |
| FIW | | 0.8025 | 0.8025 |
| f | | 2.40" | 2.15" |

It should be understood that the invention is by no means limited to the embodiments which have been discussed above. For example, although the foregoing discussion has focused on a completely circular arrangement of screens, the invention is also applicable to an arcuate screen arrangement which does not form a complete circle. Although only an eight- or nine-screen system has been discussed; moreover, the invention, unlike prior art solutions, is equally applicable to any number of screens, and the mathematical expressions given above may be used to determine the geometrical properties of screen systems with an arbitrary number of screens. Furthermore, although screen 3 illustrates the viewers 23 on the lower level 15 and the projectors 5 on the upper level 11, the invention also encompasses circular projection and display systems in which the relative positions of the viewers 23 and projectors 5 are reversed. (In such an arrangement, of course, the tilt of the screens 3 and projectors 5 would have to be upward, rather than downward.) It is also possible to mount the projectors 5 within the viewing area 24, rather than outside of it.

In short, the invention is intended to encompass a broad variety of embodiments, features and advantages, only some of which have been thus far described. The invention is limited only by the following claims.

What is claimed is:

1. A multiple screen picture system comprising:
   a plurality of trapezoidal screens, each having a flat reflective surface of trapezoidal shape wherein the screen bottom width is greater than the screen top width;
   screen mounting means for mounting said plurality of screens in a continuous arcuate array positioned about a central vertical axis of such array and with each of said screens tilted to face in a downward inclined direction relative to said axis; and
   a plurality of motion picture projectors provided to project an image on each of said screens.

2. The multiple screen picture system of claim 1 wherein each of said plurality of motion picture projectors is provided with means for tilting the angle of projection therefor in a downward inclined direction toward an associated one of said screens.

3. The multiple screen picture system of claim 1 wherein:
   projector positioning means are provided in association with each of said projectors for positioning the associated projector opposite and vertically above an associated one of said screens upon which it is adapted to project an image; and
   means for tilting the angle of projection of each of said projectors in a downward inclined direction toward its associated one of said screens.

4. The multiple screen picture system of claims 1, 2 or 3, wherein the ratio of the distance between the projector lens and the top of the screen to the screen top width is substantially equal to the ratio of the distance between the projector lens and the bottom of the screen to the screen bottom width.

5. The multiple screen picture system of claims 1, 2 or 3, wherein each of said screens is contiguous with an adjacent one of said screens with the reflective surfaces of such adjacent screens being contiguous to one another to provide uninterrupted reflective surfaces about said array.

6. The multiple screen picture system of claims 1, 2 or 3, wherein said plurality of screens comprises eight or nine substantially identical screens arranged in a closed loop circular array to provide a 360° viewing presentation.

7. The multiple screen picture system of claims 1, 2 or 3, wherein the angle of projection of each of said projectors toward its associated screen and the configuration of the trapezoidal shape of such screen reflective surfaces are provided so that such screen surfaces appear as a rectangle to the projector perspective thereof.

8. The multiple screen system of claim 1 wherein said plurality of screens comprises eight substantially identical screens arrayed in a closed loop circular array to provide a 360° viewing presentation and wherein each of said plurality of screens is tilted by substantially 7° from a vertical axis.

9. The multiple screen system of claim 1 wherein said plurality of screens comprises nine substantially identical screens arrayed in a closed loop circular array to provide a 360° viewing presentation and wherein each of said plurality of screens is tilted by substantially 8° from a vertical axis.

10. A multiple screen and image projection system comprising:
    a plurality of flat trapezoidal image-reflecting screens having wider bottom edges than top edges;
    screen mounting means for mounting said screens in an arcuate array, individual ones of said flat screens defining chords of an arc defining an outer extent of said array;
    a plurality of projectors, each capable of projecting a rectangular image, and projector mounting means for mounting said projectors at individual locations spaced vertically about said array with individual projectors provided to project downward at an associated one of said screens, whereby said projector rectangular images become trapezoidal reflected images when projected on said screens.

11. A multiple screen and projector system comprising:
   a plurality of flat, trapezoidal screens arranged in a generally circular array, individual screens defining adjacent chords lying within a circle encompassing said array;
   screen mounting means associated with said screens for mounting each screen with a bottom edge being wider than a top edge of the trapezoidal shape thereof and with each of the screens inclined at a predetermined angle from vertical to face inward and downward relative to the array; and
   a plurality of projectors for projecting rectangular images and means for mounting them to project from a location above said array in a downward inclined direction across said array toward a selected one of said screens, the inclined direction of each such projector projecting to its associated screen and the trapezoidal shape of such screen being such that the rectangular image of such projector substantially fits the opposite inclined, flat trapezoidal screen.

12. The multiple screen and image projection system of claim 11 wherein said screen mounting means is provided so as to mount said screen to face in a downward inclined direction for viewing from below said array.

13. The multiple screen and image projection system of claim 11 wherein the ratio of the width of the bottom of each screen to the distance from the projector to such bottom is equal to the ratio of the width of the top of each screen to the distance from the projector to such top.

14. The 360° picture system of claim 13 wherein the ratio of screen segment top width to top projector throw is equal to the ratio of screen segment bottom width to base projection throw, wherein the screen top and bottom width are the dimensional width of the reflective surface of each of said screen segments at the top and bottom, respectively, and the top and bottom projection throw are the dimensional distances the top and bottom of said segments are from the lens of the associated projector.

15. A 360° picture system comprising:
   a generally circular continuous screen made up of a plurality of flat trapezoidal screen segments, the reflective surfaces of such segments being contiguous to each other to present a substantially continuous, uninterrupted, but segmented reflective surface;
   a viewing area below said screen, each of said screen segments being inclined downward to face toward said viewing area; and
   a plurality of projector and mounting means for mounting each such projector at a location outside of and above said screen to project downward at a selected one of said screen segments from across the top of said screen.

16. A circular picture system for providing a 360° picture presentation comprising:
   a plurality of flat trapezoidal screens;
   screen mounting means for mounting said screens in a circular array about a central vertical axis with each of said screens tilted to face in a downward inclined direction at a predetermined angle relative to said vertical axis; and
   a plurality of projectors provided to project a picture image on each of said screens.

17. The circular picture system of claim 16 wherein N is the number of screens, R is the radius of the circular array, each projector is positioned at a height HNY above a lower delimiting plane of the array and at a radial distance HNX outside of the circular array, wherein
   HNY=(1+y)*HSC, where y is a predetermined vertical offset factor and HSC is a predetermined screen cylinder height;
   HNX=2*x*R, where x is a predetermined radial offset factor; and
   wherein the width of the base of each screen is substantially equal to:

$2*R*\sin(180/N)$.

18. The circular picture system of claim 17 wherein the top screen width TSW of each screen is substantially equal to $2*R*\cos(180/N)*(1-2*\tan(135/N))*\tan(180/N)$.

19. The circular picture system of claim 18 wherein the height of each screen is substantially equal to HSC/cos(t) where HSC is said screen cylinder height and where t is a predetermined screen tilt angle.

20. The circular picture system of claim 19 wherein
   a screen tilt depth STD for each screen is substantially equal to HSC*tan(5);
   a base chord depth BCD for each screen is substantially equal to R*(1−cos(180/N));
   the top projection throw TPT is substantially equal to SQRT(((1+x)*d−STD−BCD)²+(y*HSC)²); and
   wherein the base projection throw BPT is substantially equal to $BPT = SQRT((1+x)*d - BCD)^2 + (1+y)*HSC)$.

21. The circular picture system of claim 20 wherein the focal length of the projection lens is substantially equal to:

$$\frac{TSW * FIW}{TPT}$$

where FIW is a predetermined film image width and TPT is the top projection throw.

22. A three horizontal level multiple screen picture system for displaying a picture comprising:
   a final horizontal level for housing viewers of the picture;
   a second horizontal level for containing a plurality of screens, each having a reflective surface, being positioned in a continuous arcuate array about a central vertical axis, and being tilted downward with respect to said axis; and
   a third horizontal level containing a plurality of motion picture projectors, each projecting a picture which is directed downward to one of said screens.

* * * * *